(12) United States Patent
Li et al.

(10) Patent No.: US 10,547,381 B2
(45) Date of Patent: Jan. 28, 2020

(54) APPARATUS AND METHOD FOR MONITORING OPTICAL SIGNAL TO NOISE RATIO, RECEIVER AND COMMUNICATION SYSTEM

(71) Applicant: FUJITSU LIMITED, Kawasaki-shi, Kanagawa (JP)

(72) Inventors: Huihui Li, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/185,561

(22) Filed: Nov. 9, 2018

(65) Prior Publication Data

US 2019/0149231 A1 May 16, 2019

(30) Foreign Application Priority Data

Nov. 16, 2017 (CN) .......................... 2017 1 1140482

(51) Int. Cl.
*H04B 10/079* (2013.01)
*H04B 17/373* (2015.01)
(Continued)

(52) U.S. Cl.
CPC ..... *H04B 10/07953* (2013.01); *H04B 10/697* (2013.01); *H04B 17/336* (2015.01); *H04B 17/373* (2015.01)

(58) Field of Classification Search
CPC .............................................. H04B 10/07953
See application file for complete search history.

(56) References Cited

U.S. PATENT DOCUMENTS

2012/0219285 A1   8/2012   Dahan et al.
2014/0369679 A1   12/2014   Vassilieva et al.
(Continued)

FOREIGN PATENT DOCUMENTS

| CN | 102231644 | 11/2011 |
| CN | 106161329 | 11/2016 |
| CN | 106301552 | 1/2017 |

OTHER PUBLICATIONS

Okamoto et al., "Digital In-band OSNR Estimation for Polarization-Multiplexed Optical Transmission", OECC/PS, 2013 (Year: 2013).*

(Continued)

*Primary Examiner* — Shi K Li
(74) *Attorney, Agent, or Firm* — Staas & Halsey LLP (57) ABSTRACT

Embodiments of this disclosure provide an apparatus and method for monitoring an optical signal to noise ratio, a receiver and a communication system. The apparatus for monitoring an optical signal to noise ratio includes extracting signals from signals obtained after an equalization processing is performed on optical signals received by a receiver, the optical signals including signals of known frequencies, and the signals extracted having the same spectral characteristics as the signals of known frequencies; correcting, according to filtering parameters used in the equalization processing, the signals extracted and outputting corrected signals; and calculating an optical signal to noise ratio according to the corrected signals. According to the embodiments of this disclosure, the optical signal to noise ratio may be calculated more accurately.

13 Claims, 4 Drawing Sheets

(51) Int. Cl.
    *H04B 17/336*     (2015.01)
    *H04B 10/69*     (2013.01)

(56) References Cited

U.S. PATENT DOCUMENTS

| | | |
|---|---|---|
| 2015/0110486 A1 | 4/2015 | Sunnerud et al. |
| 2015/0304025 A1* | 10/2015 | Liu ................ H04B 10/07951 398/28 |
| 2016/0164599 A1 | 6/2016 | Heismann |
| 2016/0261340 A1 | 9/2016 | Yang et al. |
| 2016/0269110 A1* | 9/2016 | Dahan ............... H04B 10/0793 |
| 2016/0315724 A1 | 10/2016 | Dou et al. |

OTHER PUBLICATIONS

Wang Fang et al. "An improved OSNR monitoring method for PM-QPSK coherent systems" Study on Optical Communications, Aug. 2014, 4 pages.

Meng Yan, Zhenning Tao, et al. "Experimental Investigation of Training Sequence for Adaptive Equalizer Initialization in DP-16QAM System", ECOC 2013, TU.1.E.4, 3 pages.

\* cited by examiner

APPARATUS AND METHOD FOR MONITORING OPTICAL SIGNAL TO NOISE RATIO, RECEIVER AND COMMUNICATION SYSTEM

CROSS-REFERENCE TO RELATED APPLICATIONS

This application claims the benefit of Chinese Application No. 201711140482.0, filed Nov. 16, 2017, in the State Intellectual Property Office of China, the disclosure of which is incorporated herein by reference.

TECHNICAL FIELD

This disclosure relates to the field of optical communication technologies, and in particular to an apparatus and method for monitoring an optical signal to noise ratio, a receiver and a communication system.

BACKGROUND

An optical signal to noise ratio (OSNR) is a quantity directly related to system performance, no matter in a traditional direct-detection optical communication system or in a coherent optical communication system, so attention has been paid to researches on optical signal to noise ratio monitoring technologies.

A conventional measurement method defined based on an OSNR relies on such conditions that a noise power spectrum is flat and there exists a band containing only noise and containing no signal in the spectrum. With an increase of an optical communication capacity, a transmission length and transmission rate of a coherent optical communication system have been greatly improved than before. More optical nodes will cause larger fluctuation of spectral shapes of noises, and the assumption that the noises are uniformly distributed in the spectrum will face greater challenges. And at the same time, since channel spacings are greatly reduced, it is an unrealistic subject to find a frequency band of which signals may be ignored to measure the noise power. Therefore, measurement of the OSNR in the coherent optical communication system has become a new hotspot of researches.

In an optical communication system, in addition to noises inherent in transmission links, noises introduced due to a nonlinear effect are further included; wherein, the noises include noises introduced by an intra-channel nonlinear effect and noises introduced by an inter-channel nonlinear effect. The noises introduced by the inter-channel nonlinear effect are main factors limiting the accuracy of OSNR monitoring in comparison with the noises introduced by the intra-channel nonlinear effect. The inter-channel nonlinear effect is also referred to as cross-phase modulation (XPM), and nonlinear noises caused by the XPM may further be divided into two types, phase noises and polarization crosstalk.

In OSNR monitoring, the noises introduced by the inter-channel nonlinear effect will cause a deviation between an estimated value and an actual value of the OSNR. For example, the estimated value is lower than the actual value. In order to alleviate influence of the noises introduced by the nonlinear effect on the estimated value of the OSNR, a first method is to nonlinearly compensate for a received signal at a receiver end, and a second method is to calculate white noise power according to pilot signals of different polarization states in the received signal, so as to monitor the OSNR, such a method being based on the premise that the white noise power in different polarization states is identical and the OSNRs are identical.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors in the implementation of this disclosure that in a dual-polarization fiber-optic transmission system, polarization dependent loss (PDL) produced by a polarization effect will cause different white noise power in different polarization states, resulting in different optical signal to noise ratios in different polarization states. In the above second method, it is on the premise that white noise power in different polarization states is identical, and no polarization effect is taken into account. Therefore, an error in calculating the OSNR in the second method is relatively large.

Embodiments of this disclosure provide an apparatus and method for monitoring an optical signal to noise ratio, a receiver and a communication system, in which extracted pilot signals may be corrected based on filtering parameters used in equalization processing, and an OSNR may be calculated by using the corrected pilot signals. Hence, a polarization effect may be taken into account in a process of calculating the OSNR, thereby improving accuracy of OSNR monitoring.

According to a first aspect of the embodiments of this disclosure, there is provided an apparatus for monitoring an optical signal to noise ratio, including a memory and a hardware processor executing an operation.

The operation of the apparatus includes extracting signals from signals obtained after an equalization processing is performed on optical signals received by a receiver, the optical signals including signals of known frequencies, and the signals extracted having the same spectral characteristics as the signals of known frequencies, correcting, according to filtering parameters used in the equalization processing, correct the signals extracted by the extracting unit and output corrected signals, and calculating an optical signal to noise ratio according to the corrected signals.

According to a second aspect of the embodiments of this disclosure, there is provided a receiver, including the apparatus for monitoring an optical signal to noise ratio as described in the first aspect.

According to a third aspect of the embodiments of this disclosure, there is provided a communication system, including a transmitter and a receiver; wherein the transmitter is configured to transmit optical signals including a payload and having known frequencies to the receiver, frequencies of the signals having known frequencies in two polarization states being different, and the receiver is the receiver described in the second aspect.

According to a fourth aspect of the embodiments of this disclosure, there is provided a method for monitoring an optical signal to noise ratio, including:

extracting signals from signals obtained after equalization processing is performed on optical signals received by a receiver, the optical signals including signals of known frequencies, and the first signals having the same spectral characteristics as the signals of known frequencies;

according to filtering parameters used in the equalization processing, correcting the first signals, and outputting corrected signals; and calculating an optical signal to noise ratio according to the corrected signals.

An advantage of the embodiments of this disclosure exists in that extracted pilot signals may be corrected based on filtering parameters used in equalization processing, and an OSNR may be calculated by using the corrected pilot signals. Hence, a polarization effect may be taken into account in a process of calculating the OSNR, thereby improving accuracy of OSNR monitoring.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/comprising" or "include/including" when used in this specification is taken to specify the presence of stated features, integers, steps or components but does not preclude the presence or addition of one or more other features, integers, steps, components or groups thereof.

Additional aspects and/or advantages will be set forth in part in the description which follows and, in part, will be apparent from the description, or may be learned by practice of the disclosure.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
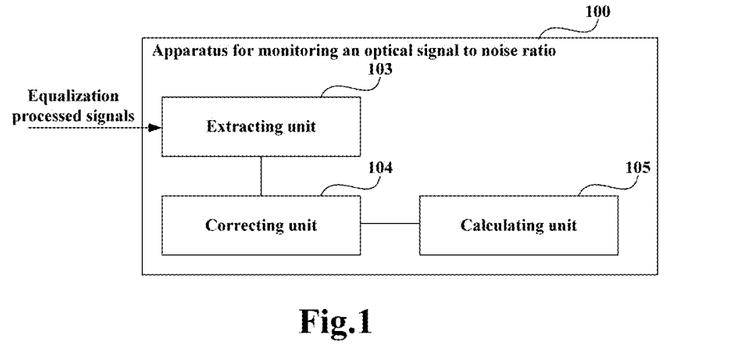
FIG. 1 is a schematic diagram of the apparatus for monitoring an optical signal to noise ratio of Embodiment 1 of this disclosure.

Embodiment 1 of this disclosure provides an apparatus for monitoring an optical signal to noise ratio, which may be applicable to a receiver of an optical communication system. FIG. 1 is a schematic diagram of the apparatus for monitoring an optical signal to noise ratio of Embodiment 1 of this disclosure. As shown in FIG. 1, an apparatus for monitoring an optical signal to noise ratio 100 may include an extracting unit 103, a correcting unit 104 and a calculating unit 105.

In this embodiment, the extracting unit 103 may be configured to extract first signals from signals obtained after equalization processing is performed on optical signals received by a receiver, the optical signals including signals of known frequencies, and the first signals having the same spectral characteristics as the signals of known frequencies; the correcting unit 104 may be configured to, according to filtering parameters used in the equalization processing, correct the first signals extracted by the extracting unit and output corrected signals; and the calculating unit 105 may be configured to calculate an optical signal to noise ratio according to the corrected signals.

According to this embodiment, the extracted first signals may be corrected based on the filtering parameters used in the equalization processing, and the optical signal to noise ratio (OSNR) may be calculated by using the corrected signals. Hence, a polarization effect may be taken into account in a process of calculating the OSNR, thereby improving accuracy of OSNR monitoring.

In this embodiment, the optical signals received by the receiver may be from an optical transmitter, and the optical signals include signals of known frequencies, such as pilot signals, the pilot signals being pilot signals having a single frequency. In the following description of this embodiment, the signals of the known frequencies being pilot signals of a single frequency shall be taken as an example; however, this embodiment is not limited thereto, and the signals of the known frequency may have other frequencies and have other spectral features.

In this embodiment, the frequencies of the pilot signals of the optical signals in different polarization states may be different, and the different polarization states may include a horizontal polarization state (H polarization state) and a vertical polarization state (V polarization state).

In this embodiment, the optical signals transmitted by the optical transmitter include pilot signals, and further include a payload.

Figure 2:
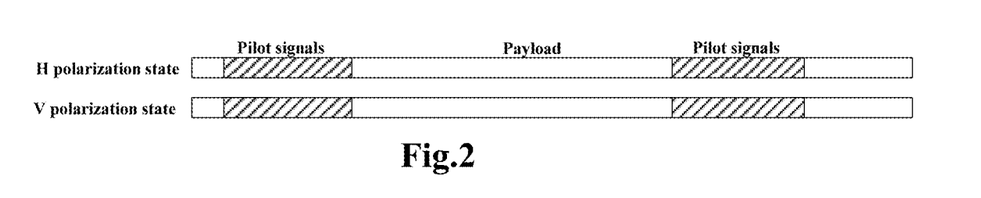
FIG. 2 is a schematic diagram of a time domain structure of an optical signal inserted with pilot signals.

FIG. 2 is a schematic diagram of a time domain structure of an optical signal inserted with pilot signals. As shown in FIG. 2, the optical signal may include pilot signals and non-pilot signals, the non-pilot signals being actually transmitted data, i.e. payloads.

Figure 3A:
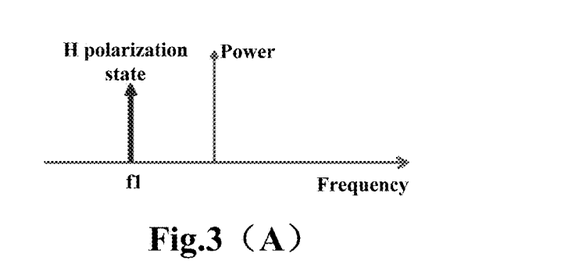
FIG. 3(A) is a spectral diagram of a pilot signal in an H polarization state of Embodiment 1 of this disclosure.
Figure 3B:
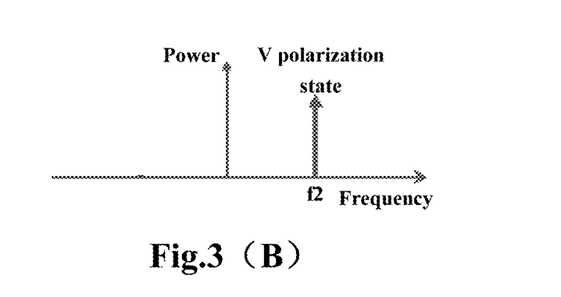
FIG. 3(B) is a spectral diagram of a pilot signal in a V polarization state of Embodiment 1 of this disclosure.

FIGS. 3(A) and 3(B) are spectral diagrams of pilot signals of different polarization states of this embodiment. As shown in FIG. 3(A), in the H polarization state of the optical signal, the pilot signals have a single frequency f1; and as shown in FIG. 3(B), in the V polarization state of the optical signal, the pilot signals have a single frequency f2. In addition, this embodiment may not be limited thereto, and the pilot signals in the polarization states may not have a single frequency, but have a frequency Band.

Figure 4:
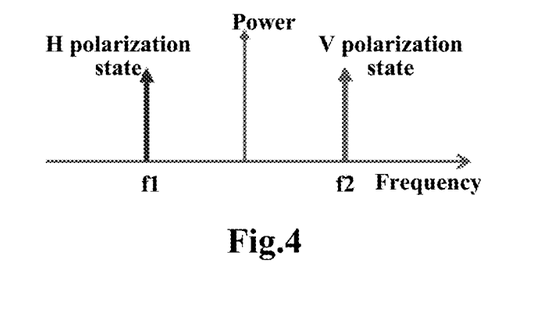
FIG. 4 is a schematic diagram of presenting a spectrum of the pilot signal in the H polarization state and a spectrum of the pilot signal in the V polarization state in the same spectrum.

FIG. 4 is a schematic diagram of presenting a spectrum of the pilot signal in the H polarization state and a spectrum of the pilot signal in the V polarization state in the same spectrum. As shown in FIG. 4, a spectral feature of the pilot signals in the H polarization state is a peak value having power at the frequency f1, and a spectral feature of the pilot signals in the V polarization state is a peak value having power at the frequency f2.

In this embodiment, f2 may be equal to −f1, and furthermore, a relationship between f1 and f2 may not be limited thereto.

In this embodiment, as shown in FIG. 1, the signals obtained after the received optical signals equalization processed by the receiver are inputted to the extracting unit 103, and the extracting unit 103 may extract the first signals from the equalization processed signals, the first signal having the same spectral features as the signals having known frequencies.

In this embodiment, as shown in FIG. 2, FIG. 3 and FIG. 4, the signals having known frequencies may be pilot signals having a single frequency in the polarization states. For example, in the H polarization state of the optical signals, the pilot signals have a single frequency f1, and a spectral characteristics thereof is a peak value having power at the frequency f1; and in the V polarization state of the optical signals, the pilot signals have a single frequency f2, and a spectral characteristics thereof is a peak value having power at the frequency f2.

In this embodiment, the extracting unit 103 may extract signals with spectral characteristics identical to those of the pilot signals in the H polarization state in FIG. 3(A) from the signals $\widetilde{E_H}(f_n)$ in the H polarization state of the equalization processed signals and take the extracted signals as the first signals in the H polarization state; and the extracting unit 103 may extract signals with spectral features identical to those of the pilot signals in the V polarization state in FIG. 3(B) from the signals $\widetilde{E_V}(f_n)$ in the V polarization state of the equalization processed signals and take the extracted signals as the first signals in the V polarization state.

Figure 5:
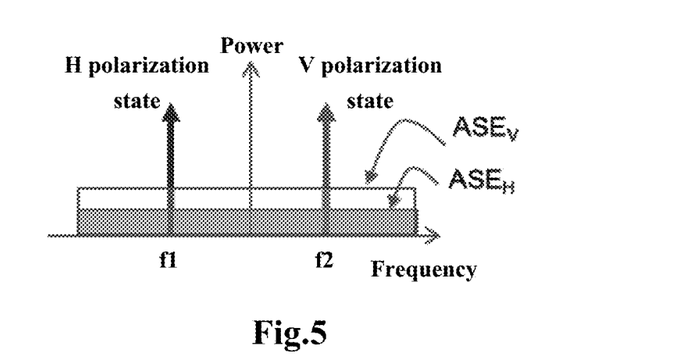
FIG. 5 is a schematic diagram of presenting a spectrum of a first signal in the H polarization state and a spectrum of a first signal in the V polarization state in the same spectrum.

FIG. 5 is a schematic diagram of presenting a spectrum of a first signal in the H polarization state and a spectrum of a first signal in the V polarization state in the same spectrum. In FIG. 5, the horizontal axis denotes a frequency and the vertical axis denotes power. As shown in FIG. 5, the spectral features of the first signals in the H polarization state is a peak value having power at the frequency f1, and the spectral features of the first signals in the V polarization state is a peak value having power at the frequency f2.

As shown in FIG. 5, the peak value of the power of the first signals extracted by the extracting unit 103 at f1 and the peak value of the power of the first signals extracted by the extracting unit 103 at f2 may be identical.

In this embodiment, as shown in FIG. 5, the first signals in the H polarization state and the first signals in the V polarization state extracted by the extracting unit 103 both have spectral noises. For example, the spectral noises may be amplifier spontaneous emission (ASE) noises, denoted by ASEv and ASEh, respectively.

In this embodiment, according to the filter parameters used in the equalization processing, the correcting unit 104 may correct the first signals extracted by the extracting unit 103, so as to output the corrected signals. For example, the correcting unit 104 may perform the correction according to the following formula:

$$[P_H(f_n) \ P_V(f_n)] = [\widetilde{P_H}(f_n) \ \widetilde{P_V}(f_n)] * \begin{bmatrix} M_{HH}(f_n) & M_{HV}(f_n) \\ M_{VH}(f_n) & M_{VV}(f_n) \end{bmatrix}^{-1} \quad (1)$$

$$n = 1, 2, \ldots, N$$

where, $\widetilde{P_H}(f_n)$ and $\widetilde{P_V}(f_n)$ denote components of power of different polarization states of the first signals, and $P_H(f_n)$, $P_V(f_n)$ denote components of power of different polarization states of the corrected signals;

in formula (1), n is a natural number and denotes indices to which sampling frequencies of the first signals extracted by the extracting unit 103 correspond, and N is a natural number and denote the number of the sampling frequencies of the first signals;

$M_{HH}(f_n)$, $M_{HV}(f_n)$, $M_{VH}(f_n)$, $M_{VV}(f_n)$ denote filtering parameters used in the equalization processing; and where, $M_{HH}(f_n)$ denotes a filter spectrum used in the equalization processing corresponding to a first polarization state, $M_{HV}(f_n)$ denotes a filter spectrum used in the equalization processing corresponding to crosstalk of the first polarization state to a second polarization state, $M_{VH}(f_n)$ denotes a filter spectrum used in the equalization processing corresponding to crosstalk of the second polarization state to the first polarization state, $M_{VV}(f_n)$ denotes a filter spectrum used in the equalization processing corresponding to the second polarization state, and the first polarization state and the second polarization state may be the H polarization state and the V polarization state, respectively.

Figure 6:
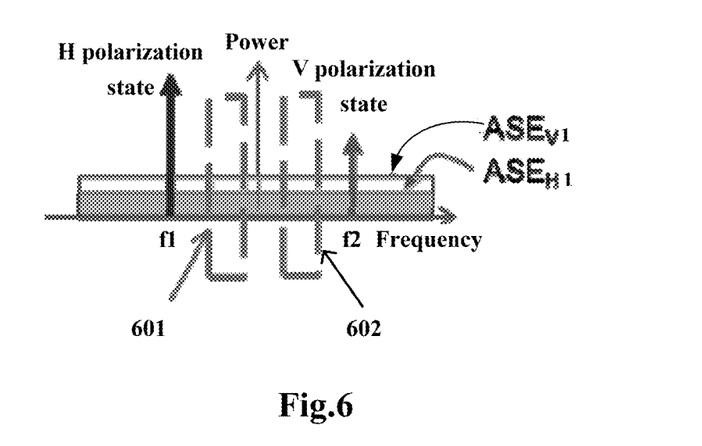
FIG. 6 is a schematic diagram of presenting a spectrum of a component of a corrected signal in the H polarization state and a spectrum of a component of the corrected signal in the V polarization state in the same spectrum.

FIG. 6 is a schematic diagram of presenting a spectrum of a component of a corrected signal in the H polarization state and a spectrum of a component of the corrected signal in the V polarization state in the same spectrum. As shown in FIG. 6, the peak value of the power of the component of the corrected signals in the H polarization state at f1 is different from the peak value of the power of the component of the corrected signals in the V polarization state at f2.

As shown in FIG. 6, both the component of the corrected signals in the H polarization state and the component of the corrected signals in the V polarization state have spectral noises. For example, the noises may be ASE noises, which are denoted by $ASE_{V1}$ and $ASE_{H1}$, respectively.

In this embodiment, as shown in FIG. 6, the signal to noise ratios of the first signals in the H polarization state and the V polarization state may be corrected by the correcting unit 104, thereby reflecting the polarization effect during transmission of the optical signals. Hence, subsequent calculation of the optical signal to noise ratios may be made more accurate.

In this embodiment, the calculating unit 105 may calculate the optical signal to noise ratios according to the corrected signals $P_H(f_n)$, $P_V(f_n)$. For example, the calculating unit 105 may calculate the optical signal to noise ratios (OSNRs) according to the power of the noise signals in the corrected signals.

In this embodiment, the calculating unit 105 may select a range of frequencies different from the known frequencies (for example, a range of frequencies different from f1 and f2) in the corrected signals, and calculate power of the ASE noises of the corrected signals in the range of frequencies, thereby obtaining the optical signal to noise ratios (OSNRs) of the optical signals through calculation. For example, the calculating unit 105 may select a range of frequencies shown by a frame 601 in dotted lines in FIG. 6, calculate a mean value of the noise power in the range of frequencies, and take it as the power of the noises in the H polarization state; and the calculating unit 105 may select a range of frequencies shown by a frame 602 in dotted lines in FIG. 6, calculate a mean value of the noise power in the range of frequencies, and take it as the power of the noises in the V polarization state.

The calculating unit 105 may obtain the optical signal to noise ratios by using any existing method, which shall be described below by way of examples.

For example, the optical signal-to-noise ratios in the two polarization states (H and V polarization states) are obtained by using formulae (2) and (3), respectively:

$$OSNR_H=10*\log 10(S_H/N_H)-10*\log 10(12.5e9/\text{Bandwidth}) \quad (2),$$

$$OSNR_V=10*\log 10(S_V/N_V)-10*\log 10(12.5e9/\text{Bandwidth}) \quad (3);$$

where, H denotes the H polarization state, V denotes the V polarization state, $S_H$ and $S_V$ are the power of the signals in the H polarization state and the V polarization state, respectively, $OSNR_H$ and $OSNR_V$ are the optical signal to noise ratios in the H polarization state and the V polarization state, respectively, $N_H$ and $N_V$ are the power of the noises in the H polarization state and the V polarization state, respectively, Bandwidth is a signal bandwidth, and the value 12.5e9 is because that noise power in the 12.5 GHz bandwidth needs to be taken into account in the OSNR calculation, which may be adjusted according to a particular frequency bandwidth.

However, the embodiment of this disclosure is not limited to the manners of the above formulae (2) and (3), and other methods may also be used to obtain the optical signal to noise ratios in the two polarization states, which shall not be enumerated herein any further.

In this embodiment, the calculation of the power $S_H$ and $S_V$ of the signals in the two polarization states (polarization directions) may be performed for a time period of a payload. This is because optical transmission links often includes a number of optical filters. Since attenuation of the frequencies at which the pilot signals are located is not equal to average loss of the signals, the power of the pilot signals at the receiver end is not equal to the power of the signals. Calculated power in the time period of the payload is equal to a sum of the power of the signals and the power of the noises. Therefore, in combination with the power $N_H$ and $N_V$ of the noises obtained by the calculating unit 105, the power $S_H$ and $S_V$ of the signals in the two polarization states may be obtained. For example, the power $S_H$ and $S_V$ of the signals in the two polarization states may be obtained by subtracting the power $N_H$ and $N_V$ of the noises in the two polarization states by the calculated power in the time period of the payload in the two polarization states obtained through calculation.

In this embodiment, the power $S_H$ and $S_V$ of the signals may be obtained by the calculating unit 105 through calculation. And furthermore, other units may also be provided to obtain the power $S_H$ and $S_V$ of the signals through calculation.

According to the apparatus for monitoring an optical signal to noise ratio of the embodiment of this disclosure, the first signals may be corrected based on the filtering parameters used in the equalization processing, and the optical signal to noise ratio (OSNR) may be calculated by using the corrected signals. Hence, the polarization effect may be taken into account in the process of calculating the OSNR, thereby improving accuracy of OSNR monitoring.

Figure 7:
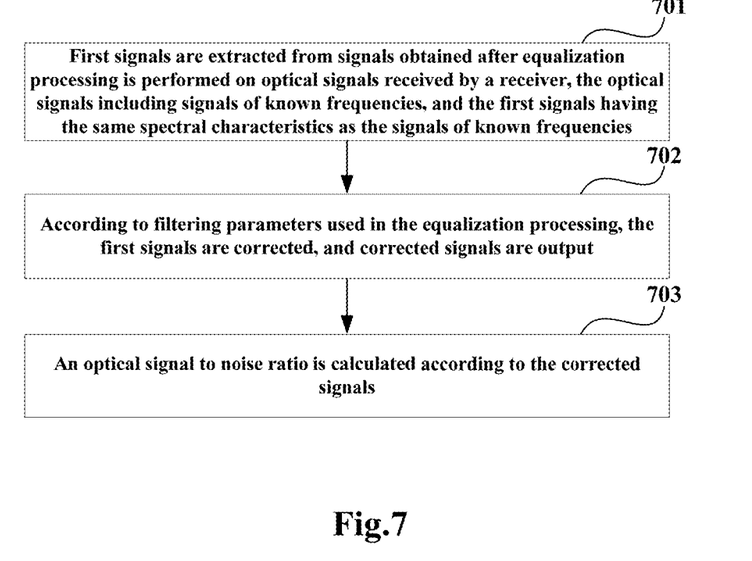
FIG. 7 is a flowchart of the method for monitoring an optical signal to noise ratio of Embodiment 1 of this disclosure.

FIG. 7 is a flowchart of the method for monitoring an optical signal to noise ratio of Embodiment 1 of this disclosure, in which an optical signal to noise ratio is calculated according to optical signals received by a receiver, the optical signals including signals of known frequencies. As shown in FIG. 7, the method includes:

operation 701: first signals are extracted from signals obtained after equalization processing is performed on optical signals received by a receiver, the optical signals including signals of known frequencies, and the first signals having the same spectral characteristics as the signals of known frequencies;

operation 702: according to filtering parameters used in the equalization processing, the first signals are corrected, and corrected signals are output; and operation 703: an optical signal to noise ratio is calculated according to the corrected signals.

In this embodiment, the description of the units of the apparatus for monitoring an optical signal to noise ratio may be referred to for description of the above steps, which shall not be described herein any further.

According to the method for monitoring an optical signal to noise ratio of the embodiment of this disclosure, the first signals may be corrected based on the filtering parameters used in the equalization processing, and the optical signal to noise ratio (OSNR) may be calculated by using the corrected signals. Hence, the polarization effect may be taken into account in the process of calculating the OSNR, thereby improving accuracy of OSNR monitoring.

Embodiment 2

Embodiment 2 of this disclosure provides a receiver, including the apparatus 100 for monitoring an optical signal to noise ratio described in Embodiment 1, with its structure being as that described in Embodiment 1, which shall not be described herein any further.

Figure 8:
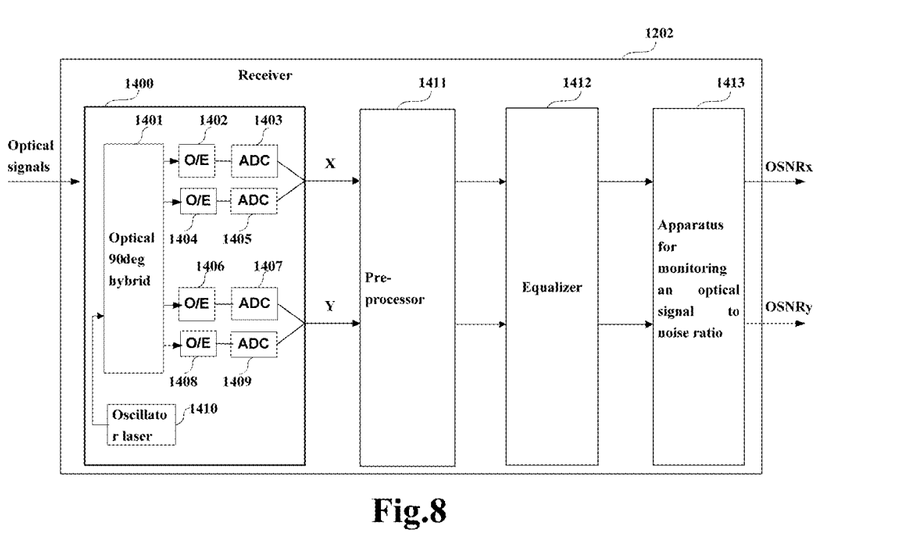
FIG. 8 is a schematic diagram of a structure of the receiver of Embodiment 2 of this disclosure.

FIG. 8 is a schematic diagram of the structure of the receiver of Embodiment 2 of this disclosure.

In addition, after signals transmitted by a transmitter 1201 are transmitted via a link 1203, the signals received by a receiver 1202 may include various linear and nonlinear damages. Therefore, before an apparatus for monitoring an optical signal to noise ratio 1413 extracts pilot signals and non-pilot signals in different polarization states, corresponding processing may be performed on the received signals, such as compensating for residual dispersion of the received signals, imbalance effects of the receiver, and frequency offsets and phase noises between the receiver and the transmitter.

As shown in FIG. 8, the receiver 1202 includes a front end 1400, a pre-processor 1411, an equalizer 1412, and the apparatus for monitoring an optical signal to noise ratio 1413.

In this embodiment, a function of the front end 1400 is to convert received optical signals into baseband signals in two polarization states. In the embodiment of this disclosure, the two polarization states may include an X polarization state and a Y polarization state. For example, the X polarization state and the Y polarization state may correspond to the H polarization state and the V polarization state, respectively.

As shown in FIG. 8, the front end 1400 includes: an oscillator laser 1410, an optical 90 deg hybrid 1401, optoelectronic (O/E) detectors 1402, 1404, 1406 and 1408, and analog-to-digital converters (ADCs) 1403, 1405, 1407 and 1409; wherein, the oscillator laser 1410 is configured to provide a local light source; an optical signal is converted into a baseband signal in a polarization state after passing through the optical 90 deg hybrid 1401, the opto-electronic (O/E) detectors 1402 and 1404 and the analog-to-digital converters (ADCs) 1403 and 1405; and the optical signal is converted into a baseband signal in another polarization state after passing through the optical 90 deg hybrid 1401, the opto-electronic (O/E) 1406 and 1408 and the analog-to-digital converters (ADCs) 1407 and 1409, with a detailed process being similar to that in the related art, and being not going to be described herein any further.

In this embodiment, the pre-processor 1411 is capable of pre-processing signals outputted by the front end. For example, the pre-processing may include dispersion compensation, and/or synchronization processing, and/or in-phase/quadrature (I/Q) path imbalance compensation processing, etc. In this embodiment, the pre-processing may improve accuracy of the calculation of the optical signal to noise ratio.

In this embodiment, the equalizer 1412 may perform equalization processing on the signals outputted by the pre-processor 1411, the equalization processing being able to equalize undesired characteristics of channels and eliminate inter-symbol crosstalk. For example, the equalizer 1412 may filter the signals according to the filtering parameters to perform the equalization processing. For example, the equalization processing may be expressed as the following formulae (4) and (5):

$$\widehat{E_H}(f_n) = M_{HH}(f_n)R_H(f_n) + M_{VH}(f_n)R_V(f_n) \quad (4),$$

$$\widehat{E_V}(f_n) = M_{HV}(f_n)R_H(f_n) + M_{VV}(f_n)R_V(f_n) \quad (5);$$

where, $R_H(f_n)$ denotes signals in the H polarization state of the signals processed by the pre-processor 1411, $R_V(f_n)$ denotes signals in the V polarization state of the signals processed by the pre-processor 1411, $\widehat{E_H}(f_n)$ denotes signals in the H polarization state outputted by the equalizer 1412, $\widehat{E_V}(f_n)$ denotes signals in the V polarization state outputted by the equalizer 1412, $M_{HH}(f_n)$, $M_{HV}(f_n)$, $M_{VH}(f_n)$ and $M_{VV}(f_n)$ respectively denote the filtering parameters used by the equalizer. The filtering parameters may be filtering spectra corresponding to different polarization states. For example, $M_{HH}(f_n)$ denotes a filter spectrum used in performing the equalization processing and corresponding to a first polarization state, $M_{HV}(f_n)$ denotes a filter spectrum used in performing the equalization processing and corresponding to crosstalk of the first polarization state to a second polarization state, $M_{VH}(f_n)$ denotes a filter spectrum used in performing the equalization processing and corresponding to crosstalk of the second polarization state to the first polarization state, and $M_{VV}(f_n)$ denotes a filter spectrum used in performing the equalization processing and corresponding to the second polarization state; and in formulae (4) and (5), n is a natural number and denotes indices to which sampling frequencies of the signals outputted by the pre-processor 1411 correspond.

In this embodiment, the pre-processor 1411 and the equalizer 1412 may perform the above processing on the signals by using any existing techniques, such as that described in Document "Experimental Investigation of Training Sequence for Adaptive Equalizer Initialization in DP-16QAM System, ECOC 2013, TU.1.E.4", the contents of which being incorporated herein, and being not going to be described herein any further.

In this embodiment, as shown in FIG. 8, the apparatus for monitoring an optical signal to noise ratio 1413 may calculate the optical signal to noise ratio according to the equalization processed signals outputted by the equalizer 1412. Description of the apparatus 100 for monitoring an optical signal to noise ratio in Embodiment 1 may be referred to for description of the apparatus for monitoring an optical signal to noise ratio 1413, which shall not be described herein any further.

Furthermore, the equalization processed signals outputted by the equalizer 1412 may be inputted not only into the apparatus for monitoring an optical signal to noise ratio 1413, but also into other units of the receiver 1202, or may be outputted to the outside of the receiver 1202.

Furthermore, in this embodiment, the receiver 1202 may not include the pre-processor 1411.

Furthermore, in this embodiment, the receiver 1202 may also include other units. For example, the receiver 1202 may also include a frequency difference compensator, and a phase noise compensator (not shown), etc., for compensating for frequency offsets and phase noises between the receiver and the transmitter.

Figure 9:
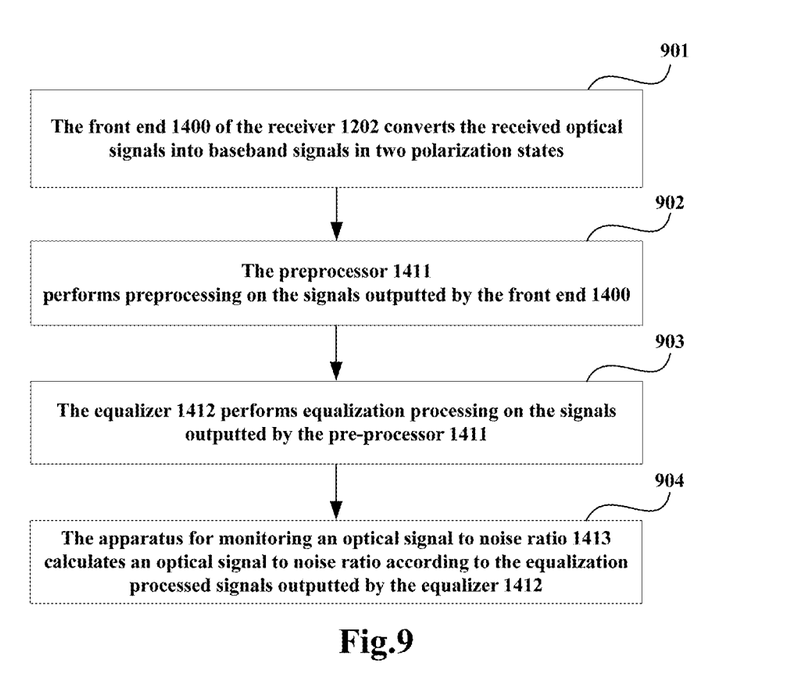
FIG. 9 is a flowchart of the receiver of Embodiment 2 of this disclosure.

FIG. 9 is a flowchart of the receiver of the embodiment of this disclosure. As shown in FIG. 9, the process includes:

901: the front end 1400 of the receiver 1202 converts the received optical signals into baseband signals in two polarization states;

902: the preprocessor 1411 performs preprocessing on the signals outputted by the front end 1400;

903: by the equalizer 1412 performs equalization processing on the signals outputted by the pre-processor 1411; and 904: the apparatus for monitoring an optical signal to noise ratio 1413 calculates an optical signal to noise ratio according to the equalization processed signals outputted by the equalizer 1412.

In an embodiment, particular implementation of operation 904 may be as shown in the flowchart in FIG. 7.

It can be seen from the above embodiment that the apparatus for monitoring the optical signal to noise ratio of the receiver may correct the first signals based on the filtering parameters used in the equalization processing, and then calculate the optical signal to noise ratio (OSNR) by using the corrected signals. Hence, a polarization effect may be taken into account in a process of calculating the OSNR, thereby improving accuracy of OSNR monitoring.

Embodiment 3

Figure 10:
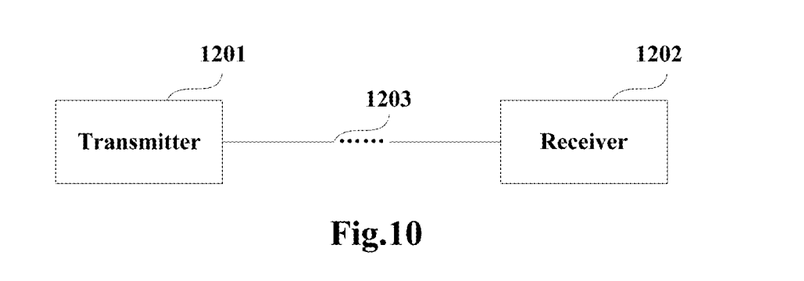
FIG. 10 is a schematic diagram of a structure of the communication system of Embodiment 3 of this disclosure.

FIG. 10 is a schematic diagram of a structure of the coherent optical communication system of Embodiment 3 of this disclosure. As shown in FIG. 10, the coherent optical communication system 1200 includes a transmitter 1201, a receiver 1202 and a link 1203 between the transmitter 1201 and the receiver 1202. For example, a structure of the receiver 1202 is as described in Embodiment 2, the contents of which being incorporated herein, and being not going to be described herein any further.

In this embodiment, the transmitter 1201 may transmit optical signals, the optical signals including a payload and signals having known frequencies; wherein, frequencies of the signals having known frequencies in two polarization states are different, a time domain structure of the optical signals may be as shown in FIG. 2, and the spectra of the optical signals may be as shown in FIG. 4. The optical signals are propagated via the link 1203 and are received by the receiver 1202. In the receiver 1202, the received optical signals are processed by the front end portion 1400, the pre-processor 1411 and the equalizer 1412, and the apparatus for monitoring an optical signal to noise ratio 1413 calculates the signal to noise ratio based on the signals equalization processed by the equalizer 1412.

In this embodiment, the two polarization states are differentiated by frequencies of the pilot signals in the coherent optical communication system, and the signal to noise ratios in the two polarization states may be calculated, thereby obtaining more accurate optical signal to noise ratios. And the first signals may be corrected based on the filtering parameters of a filter in the equalizer, and the optical signal to noise ratios (OSNRs) may be calculated by using the corrected signals. Hence, a polarization effect may be taken into account in a process of calculating the OSNR, thereby improving accuracy of OSNR monitoring.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

One or more elements and/or one or more combinations of the elements illustrated herein including in FIG. 1 may be realized as one or more hardware processor, circuit, logic device, computing equipment, or other hardware devices.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations including above embodiments 1-3, following supplements are further disclosed.

1. An apparatus for monitoring an optical signal to noise ratio, including:

an extracting unit configured to extract first signals from signals obtained after equalization processing is performed on optical signals received by a receiver, the optical signals including signals of known frequencies, and the first signals having the same spectral characteristics as the signals of known frequencies;

a correcting unit configured to, according to filtering parameters used in the equalization processing, correct the first signals extracted by the extracting unit and output corrected signals; and a calculating unit configured to calculate an optical signal to noise ratio according to the corrected signals.

2. The apparatus for monitoring an optical signal to noise ratio according to supplement 1, wherein, the calculating unit calculates the optical signal to noise ratio according to power of noises in the corrected signals.

3. The apparatus for monitoring an optical signal to noise ratio according to supplement 2, wherein, the calculating unit selects a range of frequencies different from the known frequencies in the corrected signals, and calculates the power of noises in the corrected signals in the range of frequencies, so as to obtain the signal to noise ratio (OSNR) through calculation.

4. The apparatus for monitoring an optical signal to noise ratio according to supplement 1, wherein, the correcting unit corrects the first signals outputted by the extracting unit according to the following formula:

$$[P_H(f_n) \ P_V(f_n)] = [\widehat{P_H}(f_n) \ \widehat{P_V}(f_n)] * \begin{bmatrix} M_{HH}(f_n) & M_{HV}(f_n) \\ M_{VH}(f_n) & M_{VV}(f_n) \end{bmatrix}^{-1}$$

$$n = 1, 2, \ldots, N$$

where, $\widehat{P_H}(f_n)$ and $\widehat{P_V}(f_n)$ denote components of power of different polarization states of the first signals, and $M_{HH}(f_n)$ $M_{HV}(f_n)$, $M_{VH}(f_n)$, $M_{VV}(f_n)$ denote filtering parameters used in the equalization processing;

and where, $M_{HH}(f_n)$ denotes a filter spectrum used in the equalization processing corresponding to a first polarization state, $M_{HV}(f_n)$ denotes a filter spectrum used in the equalization processing corresponding to crosstalk of the first polarization state to a second polarization state, $M_{VH}(f_n)$ denotes a filter spectrum used in the equalization processing corresponding to crosstalk of the second polarization state to the first polarization state, $M_{VV}(f_n)$ denotes a filter spectrum used in the equalization processing corresponding to the second polarization state, and $P_H(f_n)$, $P_V(f_n)$ denote components of power of different polarization states of the corrected signals, n being a natural number and denoting indices to which sampling frequencies of the first signals correspond, and N being a natural number and denoting the number of the sampling frequencies of the first signals.

5. The apparatus for monitoring an optical signal to noise ratio according to supplement 1, wherein, the signals of known frequencies are pilot signals having single frequencies.

6. A receiver, including the apparatus for monitoring an optical signal to noise ratio as described in any one of supplements 1-5.

7. A communication system, including a transmitter and a receiver; wherein, the transmitter is configured to transmit optical signals including a payload and having known frequencies to the receiver, frequencies of the signals having known frequencies in two polarization states being different;

and the receiver is the receiver described in supplement 6.

8. A method for monitoring an optical signal to noise ratio, including:

extracting first signals from signals obtained after equalization processing is performed on optical signals received by a receiver, the optical signals including signals of known frequencies, and the first signals having the same spectral characteristics as the signals of known frequencies;

according to filtering parameters used in the equalization processing, correcting the first signals, and outputting corrected signals; and calculating an optical signal to noise ratio according to the corrected signals.

9. The method for monitoring an optical signal to noise ratio according to supplement 8, wherein the calculating an optical signal to noise ratio according to the corrected signals includes:

calculating the optical signal to noise ratio according to power of noises in the corrected signals.

10. The method for monitoring an optical signal to noise ratio according to supplement 9, wherein, a range of frequencies different from the known frequencies is selected in the corrected signals, and power of noises in the corrected signals is calculated in the range of frequencies, so as to obtain the signal to noise ratio through calculation.

11. The method for monitoring an optical signal to noise ratio according to supplement 8, wherein, the first signals are corrected according to the following formula:

$$[P_H(f_n) \ P_V(f_n)] = [\widetilde{P_H}(f_n) \ \widetilde{P_V}(f_n)] * \begin{bmatrix} M_{HH}(f_n) & M_{HV}(f_n) \\ M_{VH}(f_n) & M_{VV}(f_n) \end{bmatrix}^{-1}$$

$$n = 1, 2, \ldots, N$$

where, $\widetilde{P_H}(f_n)$ and $\widetilde{P_V}(f_n)$ denote components of power of different polarization states of the first signals, and $M_{HH}(f_n)$, $M_{HV}(f_n)$ $M_{VH}(f_n)$, $M_{VV}(f_n)$ denote the filtering parameters used in the equalization processing;

and where, $M_{HH}(f_n)$ denotes a filter spectrum used in the equalization processing corresponding to a first polarization state, $M_{HV}(f_n)$ denotes a filter spectrum used in the equalization processing corresponding to crosstalk of the first polarization state to a second polarization state, $M_{VH}(f_n)$ denotes a filter spectrum used in the equalization processing corresponding to crosstalk of the second polarization state to the first polarization state, $M_{VV}(f_n)$ denotes a filter spectrum used in the equalization processing corresponding to the second polarization state, and $P_H(f_n)$, $P_V(f_n)$ denote components of power of different polarization states of the corrected signals, n being a natural number and denoting indices to which sampling frequencies of the first signals correspond, and N being a natural number and denoting the number of the sampling frequencies of the first signals.

12. The method for monitoring an optical signal to noise ratio according to supplement 8, wherein, the signals of known frequencies are pilot signals having a single frequency.

What is claimed is:

1. An apparatus for monitoring an optical signal to noise ratio, comprising:

a memory; and a hardware processor coupled to the memory and executing an operation including:

extracting signals obtained after an equalization processing is performed on optical signals received by a receiver, the optical signals including signals of known frequencies, and the signals extracted having the same spectral characteristics as the signals of known frequencies, correcting, according to filtering parameters used in the equalization processing, the signals extracted and outputting corrected signals, and calculating an optical signal to noise ratio according to the corrected signals, wherein the signals extracted are first signals, the correcting corrects the first signals according to the following formula:

$$[P_H(f_n) \ P_V(f_n)] = [\widetilde{P_H}(f_n) \ \widetilde{P_V}(f_n)] * \begin{bmatrix} M_{HH}(f_n) & M_{HV}(f_n) \\ M_{VH}(f_n) & M_{VV}(f_n) \end{bmatrix}^{-1}$$

$$n = 1, 2, \ldots, N$$

where, $\widetilde{P_H}(f_n)$ and $\widetilde{P_V}(f_n)$ denote components of power of different polarization states of the first signals, and $M_{HH}(f_n)$, $M_{HV}(f_n)$, $M^{VH}(f_n)$, $M^{VV}(f_n)$ denote the filtering parameters used in the equalization processing, and where, $M_{HH}(f_n)$ denotes a filter spectrum used in the equalization processing corresponding to a first polarization state, $M_{HV}(f_n)$ denotes a filter spectrum used in the equalization processing corresponding to crosstalk of the first polarization state to a second polarization state, $M_{VH}(f_n)$ denotes a filter spectrum used in the equalization processing corresponding to crosstalk of the second polarization state to the first polarization state, $M_{VV}(f_n)$ denotes a filter spectrum used in the equalization processing corresponding to the second polarization state, and $P_H(f_n)$, $P_V(f_n)$ denote components of power of different polarization states of the corrected signals, n being a natural number and denoting indices to which sampling frequencies of the first signals correspond, and N being a natural number and denoting the number of the sampling frequencies of the first signals.

2. The apparatus for monitoring an optical signal to noise ratio according to claim 1, wherein, the optical signal to noise ratio is calculated according to power of noises in the corrected signals.

3. The apparatus for monitoring an optical signal to noise ratio according to claim 2, wherein, the calculating selects a range of frequencies different from the known frequencies in the corrected signals, and calculates the power of noises in the corrected signals in the range of frequencies, so as to obtain the signal to noise ratio (OSNR) through the calculating.

4. The apparatus for monitoring an optical signal to noise ratio according to claim 1, wherein, the signals of known frequencies are pilot signals having single frequencies.

5. A receiver, including the apparatus for monitoring an optical signal to noise ratio as described in claim 1.

6. The receiver including the apparatus for monitoring an optical signal to noise ratio according to claim 5, wherein the optical signal to noise ratio is calculated according to power of noises in the corrected signals.

7. The receiver including the apparatus for monitoring an optical signal to noise ratio according to claim 6, wherein the calculating of the optical signal to noise ratio according to the corrected signals includes selecting a range of frequencies different from the known frequencies in the corrected signals, and calculating the power of noises in the corrected signals in the range of frequencies, so as to obtain the signal to noise ratio (OSNR) through the calculating.

8. The receiver including the apparatus for monitoring an optical signal to noise ratio according to claim 5, wherein the signals of known frequencies are pilot signals having single frequencies.

9. A communication system, comprising:
a receiver; and
a transmitter configured to transmit optical signals including a payload and having known frequencies to the receiver, frequencies of the optical signals having known frequencies in two polarization states being different; and
wherein the receiver is the receiver described in claim 5.

10. A method for monitoring an optical signal to noise ratio, including:
extracting signals obtained after an equalization processing is performed on optical signals received by a receiver, the optical signals including signals of known frequencies, and the signals extracted having the same spectral characteristics as the signals of known frequencies;
correcting, according to filtering parameters used in the equalization processing, the signals extracted, and outputting corrected signals; and
calculating an optical signal to noise ratio according to the corrected signals
wherein the signals extracted are first signals,
the first signals are corrected according to the following formula:

$$[P_H(f_n)\ P_V(f_n)] = [\widetilde{P_H}(f_n)\ \widetilde{P_V}(f_n)] * \begin{bmatrix} M_{HH}(f_n) & M_{HV}(f_n) \\ M_{VH}(f_n) & M_{VV}(f_n) \end{bmatrix}^{-1}$$

$$n = 1, 2, \ldots, N$$

where, $\widetilde{P_H}(f_n)$ and $\widetilde{P_V}(f_n)$ denote components of power of different polarization states of the first signals, and $M_{HH}(f_n)$, $M_{HV}(f_n)$, $M_{VH}(f_n)$, $M_{VV}(f_n)$ denote the filtering parameters used in the equalization processing;
and where, $M_{HH}(f_n)$ denotes a filter spectrum used in the equalization processing corresponding to a first polarization state, $M_{HV}(f_n)$ denotes a filter spectrum used in the equalization processing corresponding to crosstalk of the first polarization state to a second polarization state, $M_{VH}(f_n)$ denotes a filter spectrum used in the equalization processing corresponding to crosstalk of the second polarization state to the first polarization state, $M_{VV}(f_n)$ denotes a filter spectrum used in the equalization processing corresponding to the second polarization state, and $P_H(f_n)$, $P_V(f_n)$ denote components of power of different polarization states of the corrected signals, n being a natural number and denoting indices to which sampling frequencies of the first signals correspond, and N being a natural number and denoting the number of the sampling frequencies of the first signals.

11. The method for monitoring an optical signal to noise ratio according to claim 10, wherein the calculating an optical signal to noise ratio according to the corrected signals includes:
calculating the optical signal to noise ratio according to power of noises in the corrected signals.

12. The method for monitoring an optical signal to noise ratio according to claim 11, wherein,
a range of frequencies different from the known frequencies is selected in the corrected signals, and power of noises in the corrected signals is calculated in the range of frequencies, so as to obtain the signal to noise ratio through calculation.

13. The method for monitoring an optical signal to noise ratio according to claim 10, wherein,
the signals of known frequencies are pilot signals having a single frequency.

* * * * *